(No Model.)

A. W. McLAREN.
REMOVABLE STRAINER FOR CHURNS.

No. 428,404. Patented May 20, 1890.

Witnesses.
C. H. Keeney
Anna Faust

Inventor.
Arthur W. McLaren
Erwin Benedict
Attorneys.

UNITED STATES PATENT OFFICE.

ARTHUR W. McLAREN, OF JEFFERSON, WISCONSIN.

REMOVABLE STRAINER FOR CHURNS.

SPECIFICATION forming part of Letters Patent No. 428,404, dated May 20, 1890.

Application filed February 8, 1890. Serial No. 339,711. (No model.)

*To all whom it may concern:*

Be it known that I, ARTHUR W. MCLAREN, of Jefferson, (P. O., Helenville,) in the county of Jefferson and State of Wisconsin, have invented a new and useful Removable Strainer for Churns; and I do hereby declare the following to be a full, clear, and exact description of said invention, reference being had to the accompanying drawings, and to the letters or figures of reference marked thereon, which form a part of this specification.

In the process of churning, when the butter has separated from the milk, it is desirable to remove the milk from the churn, and also in washing the butter with water one or more times, as is commonly done, it is desirable to remove the water from the churn after each washing. In all these processes the larger part of the butter rises on the top of the milk or water, and it is desirable to remove the milk or water from beneath the butter without disturbing the mass of butter, and this is commonly done by permitting the milk or water to be discharged through an orifice therefor in the churn; but as there are frequently many small lumps or masses of butter disengaged from the principal mass and floating in the milk or water, which are liable to be drawn off through the orifice and lost, it is desirable to obviate such a result.

The object of my invention is to provide an insertible and removable strainer, which may be inserted in the churn through a proper orifice therefor below the mass of butter for drawing off the milk or water and retaining the butter, and which may be removed from the churn when the process is complete.

Figure 1:
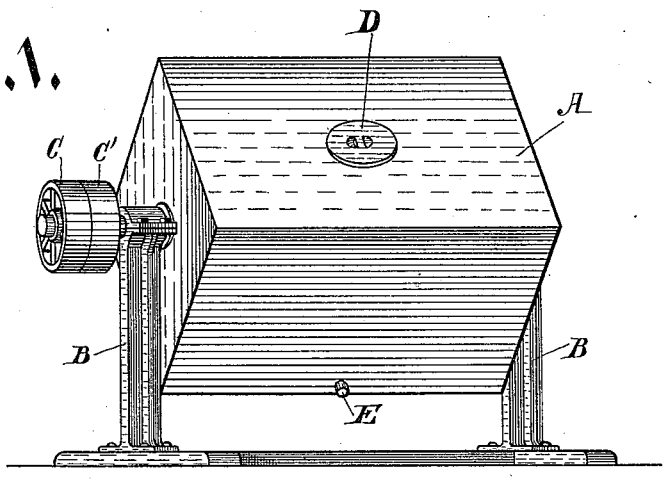
Figure 2:
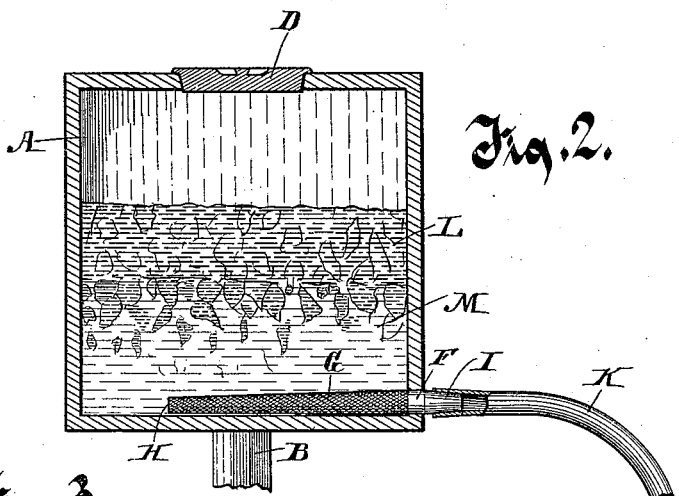
Figure 3:
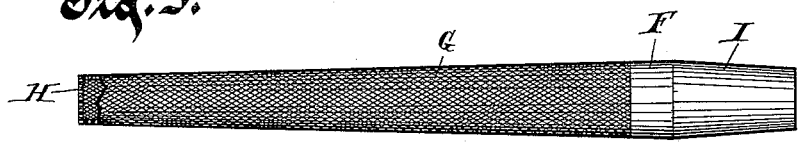

In the drawings, Figure 1 is a perspective view of a churn with which my improved device is adapted to be used. Fig. 2 is a central transverse section of the same churn with my improved device inserted therein. Fig. 3 is a view of my complete device.

In the drawings, A is the churn, supported horizontally by gudgeons fixed centrally to its ends, which gudgeons have their bearings in the posts B B. At one end the gudgeon is provided with a fast and loose pulley C and C', whereby the power is supplied for revolving the churn. The churn is provided with an orifice in one side closed by the liquid-tight cover D, which orifice is adapted for pouring in the milk before it has been churned and for removing the butter from the churn. This site of the churn is for convenience of description called the "top," and the churn is necessarily so adjusted that this side shall be the top when the aperture is open for introducing the milk or removing the butter. Another orifice through the side of the churn near the bottom is provided, which is ordinarily closed by a plug E. It is in this orifice that my improved strainer is inserted and through which the milk or water is discharged.

My improved strainer consists of a tube adapted to be inserted in the churn through the orifice in the lower part of the side of the churn, and is preferably slightly tapering in form. A short part F is of sheet metal, and is of a proper size to fit tightly in the orifice of the churn, and a longer part G, which is intended to be within the churn, is preferably formed of perforated sheet metal to form a strainer and receive the milk or water therethrough, but having meshes or perforations so small as to prohibit the passage of particles of butter. The end H is closed or formed of perforated sheet metal. The part I is also formed of sheet metal, preferably tapered inwardly toward its outer end, and is adapted to receive thereon the end of a flexible hose K. The entire tube may be made a continuous cylinder, but I prefer that the parts F and G should have a slight common taper inwardly toward the inner end, and that the part I should have a slight taper inwardly toward its outer end, as shown in Fig. 3, for greater convenience in use.

It will be understood that when the churn is in use for churning the milk the plug E closes the orifice at the side of the churn, and that when the butter L has separated from the milk M, and it is desired to draw off the milk, the plug E is removed and the strainer is inserted in the orifice and the milk is then permitted to discharge itself through the strainer, or may be run off through the hose K, attached to the strainer in the manner shown in Fig. 2.

The form of the churn with which my improved device can be used is not material to the invention, the only requirement in the churn being that the orifice for drawing off the milk or water shall be so located as to be below the butter when separated from the milk or water.

What I claim as new, and desire to secure by Letters Patent, is—

1. The combination, with a churn having an orifice closed by a removable plug, as E, of a tubular removable strainer constructed of sheet metal and tapering slightly inwardly from a medial point to its truncated inner end, and tapering slightly outwardly from the medial point to its outer truncated end, the inner end being closed up and the inner tubular portion being perforated, the strainer being fitted and adapted to be inserted in the orifice of the churn, substantially as described.

2. A removable churn-strainer, consisting of a tube having a part I tapering inwardly toward its outer end, and parts F and G tapering inwardly toward the inner end, the part G being formed of perforated sheet metal or its equivalent, and being closed or perforated only at the end H, substantially as described.

In testimony whereof I affix my signature in presence of two witnesses.

ARTHUR W. McLAREN.

Witnesses:
R. B. KIRKLAND,
WM. S. KISPERT.